United States Patent [19]

Leavitt, Jr.

[11] Patent Number: 4,527,938

[45] Date of Patent: Jul. 9, 1985

[54] PRESS-LOADING MECHANISM

[75] Inventor: John P. Leavitt, Jr., Puyallup, Wash.

[73] Assignee: American Manufacturing Company, Inc., Tacoma, Wash.

[21] Appl. No.: 161,169

[22] Filed: Jun. 19, 1980

[51] Int. Cl.³ .............................................. B65G 65/02

[52] U.S. Cl. .................................... 414/280; 100/196; 414/222

[58] Field of Search ................. 414/222, 267, 280, 35, 414/277; 100/96

[56] References Cited

U.S. PATENT DOCUMENTS

| | | | |
|---|---|---|---|
| 2,376,457 | 5/1945 | Skoog | 414/280 X |
| 2,438,896 | 4/1948 | Bowen et al. | 414/280 |
| 2,663,434 | 12/1953 | Pierce | 414/280 |
| 2,728,468 | 6/1952 | Siempelkamp . | |
| 3,799,366 | 3/1974 | Omelchuk | 100/196 X |
| 3,908,527 | 9/1975 | Brockmuller et al. | 414/35 |
| 4,242,023 | 12/1980 | Mohrsen | 100/196 X |
| 4,348,144 | 9/1982 | Nelson | 100/196 X |

FOREIGN PATENT DOCUMENTS

| | | | |
|---|---|---|---|
| 433778 | 8/1935 | United Kingdom | 414/280 |

*Primary Examiner*—Robert G. Sheridan

*Attorney, Agent, or Firm*—Ward Brown; Robert W. Beach

[57] ABSTRACT

A rail mounted carriage supporting a multishelf press loader is reciprocable between a sheet charger, which loads an individual lay-up of sheet material onto each of the loader shelves, and a multiplaten press for processing such lay-ups. After all of the loader shelves are charged with lay-ups, swingable upright lay-up-centering rods slide all of the lay-ups simultaneously farther onto the loader shelves until the leading edges of the lay-ups abut against movable stops supported adjacent to the leading or press end of the loader. The carriage is moved to the press, and the stops are raised out of edgewise registration with the lay-ups, whereupon all of the shelves and their lay-ups are moved past the raised stops and into the open press between its platens. The stops then are lowered behind the trailing edges of the lay-ups and shifted a short distance into the press to slide the lay-ups farther into the press. The stops hold the lay-ups in the press as the shelves are slid out from beneath the lay-ups. The carriage then is moved back to the charger to position the multishelf loader for receiving the next batch of lay-ups as the previous batch is processed in the press.

20 Claims, 25 Drawing Figures

3c
3b
26
29
30
48
49
50
51
52
53
54
55
6
7
31
32
71

PRESS-LOADING MECHANISM

BACKGROUND OF THE INVENTION

1. Field of the Invention

The present invention relates to carriage mounted press-loading mechanism for inserting lay-ups of sheet material between the spaced platens of a multiplaten press.

2. Prior Art

Sheet-processing presses are known having several horizontally extending, vertically spaced platens for receiving a pack or lay-up of sheet material in each space between adjacent platens. An example of such a press is a plywood bonding press having heated platens for pressing lay-ups of glued veneer sheets to set the glue and form uniform plywood sheets.

Previously, separate veneer sheet lay-ups have been inserted consecutively in the spaces between the platens of such a multiplaten press, either automatically by a mechanical press loader or manually; or a full set of lay-ups has been inserted into such a press simultaneously by a mechanical press loader. Simultaneous loading is desirable to reduce loading time, assuring maximum use of expensive multiplaten presses, and also to ensure uniform processing of the lay-ups. In the case of a plywood bonding press having a large number of heated platens, such as twenty or more, consecutive loading may result in the adhesive of the first loaded lay-up setting or curing even before the press is completely loaded.

Known mechanical press loaders have several horizontally extending, vertically spaced shelves for supporting sheet material lay-ups in edgewise registration with the spaces between the platens of an open press. In the loaders of Pierce U.S. Pat. No. 2,663,434 and British Pat. No. 433,778, vertical pusher bars move through slots in the shelves for simultaneously sliding all of the lay-ups off the shelves and into the press. In the loader of Bowen et al. U.S. Pat. No. 2,438,896, separate pushers are provided for each shelf, but all of the pushers are moved together for simultaneously sliding the lay-ups off the shelves and into the press. In the loaders of the Skoog U.S. Pat. No. 2,376,457 and Siempelkamp U.S. Pat. No. 2,728,468, the lay-up-supporting shelves themselves are inserted into the press. Each shelf of the Skoog loader has an associated horizontal pusher bar that slides its lay-up off the shelf onto a press platen as the shelf is retracted from the press whereas the Siempelkamp device has stop members mounted on the press for holding the lay-ups in the press as the shelves are retracted.

SUMMARY OF THE INVENTION

It is an object of the present invention to provide press-loading mechanism which effects simultaneous loading of several lay-ups of sheet material between the spaced platens of a multiplaten press.

It also is an object to provide such mechanism in compact form occupying a minimum amount of floor space in a factory or mill.

An additional object is to provide such mechanism adapted for reliable automatic mechanical operation with little supervision and maintenance.

A further object is to provide such mechanism in a form assuring consistent centering and positioning of lay-ups in the press.

For accomplishing the foregoing objects, the present invention is an improvement for press-loading mechanism of the type having several vertically spaced shelves for supporting lay-ups in edgewise registration with the spaces between the platens of a multiplaten press, such shelves being insertable into the press. In accordance with the invention, a stop member is provided for each shelf such that the lay-ups can be loaded onto the shelves with their leading edges abutting against the stop members. All of the stop members are raised off their shelves so that the shelves then can be moved simultaneously into the press for moving the lay-ups beneath the raised stops. The stop members then are lowered behind the trailing edges of the lay-ups and shifted a short distance into the press to slide the lay-ups farther into the press. With the stops engaging the trailing edges of the lay-ups, the shelves are retracted from the press so that the lay-ups fall onto the press platens.

In the preferred embodiment, the shelves and the stops are supported on a carriage movable in a straight line between the press and a charger for loading lay-ups onto the shelves. As the lay-ups are being loaded and uniformly centered on the shelves, a previous batch of lay-ups is processed in the press. A rack and pinion drive driven by a hydraulic motor moves the carriage from the charger to the press, and the shelves are moved into the press by another rack and pinion drive driven by another hydraulic motor. Control mechanism actuates the motors, and jacks for moving the stop members, in timed sequence for automatic operation.

BRIEF DESCRIPTION OF THE DRAWINGS

FIG. 1*a* and 1*b* (on the fourth drawing sheet) are fragmentary, enlarged, detail side elevations of the press-loading mechanism of FIG. 1 with parts shown in section, illustrating parts in different positions.

FIG. 2*a* (on the fourth drawing sheet) is a fragmentary, enlarged, detail front end elevation of the press-loading mechanism of FIG. 1.

FIG. 3*b* is a fragmentary, enlarged, horizontal section taken along line 3*b*—3*b* of FIG. 1*a; * and FIG. 3*c* is a fragmentary, enlarged, detail horizontal section taken along line 3*c*—3*c* of FIG. 2*a.*

DETAILED DESCRIPTION

Figure 1:
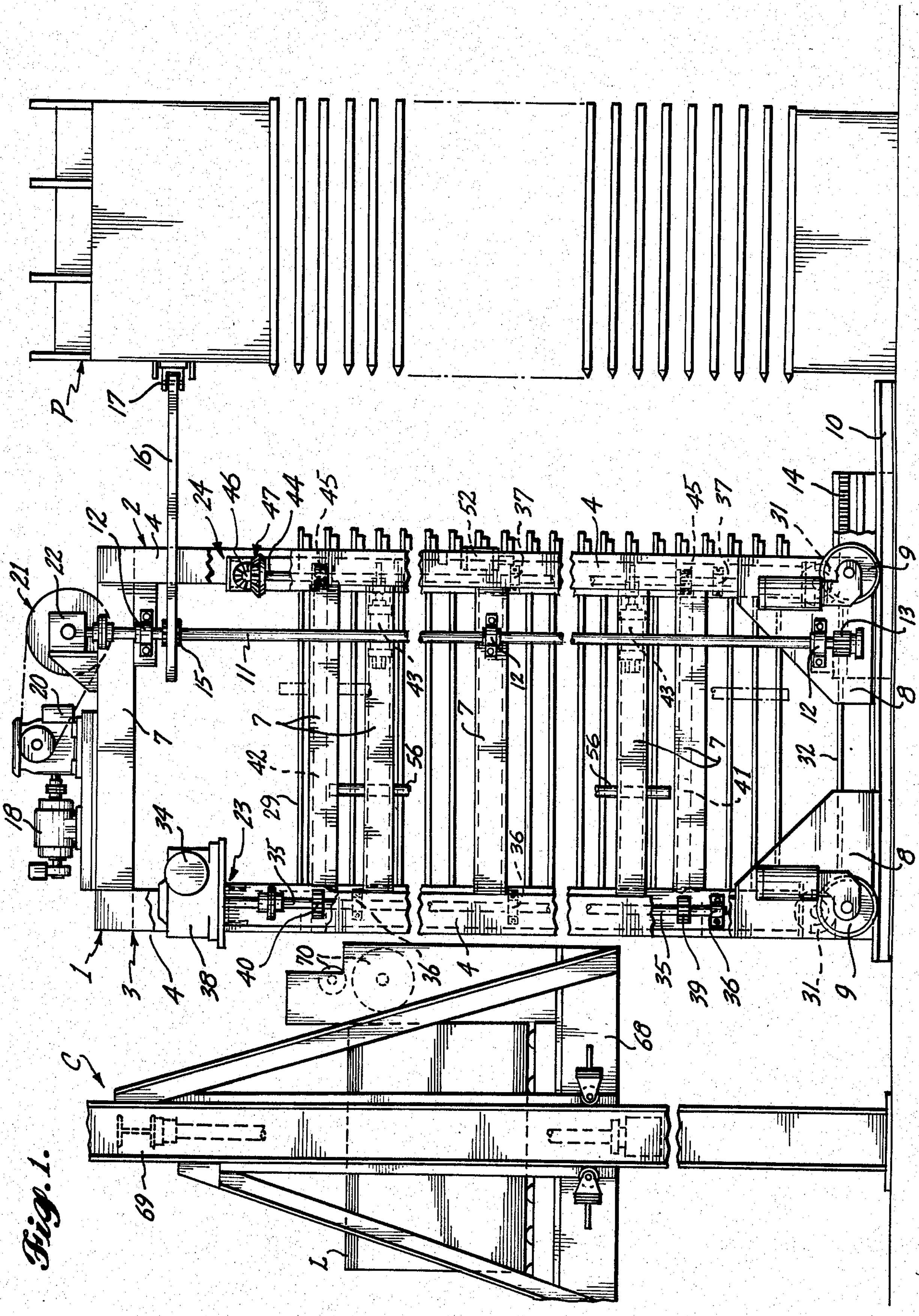
FIG. 1 is a side elevation of the preferred embodiment of press-loading mechanism in accordance with the present invention mounted between an elevator lay-up charger and a multiplaten press, the charger and press being shown somewhat diagrammatically.
Figures 1A, 1B, 2A, 3B, 3C:
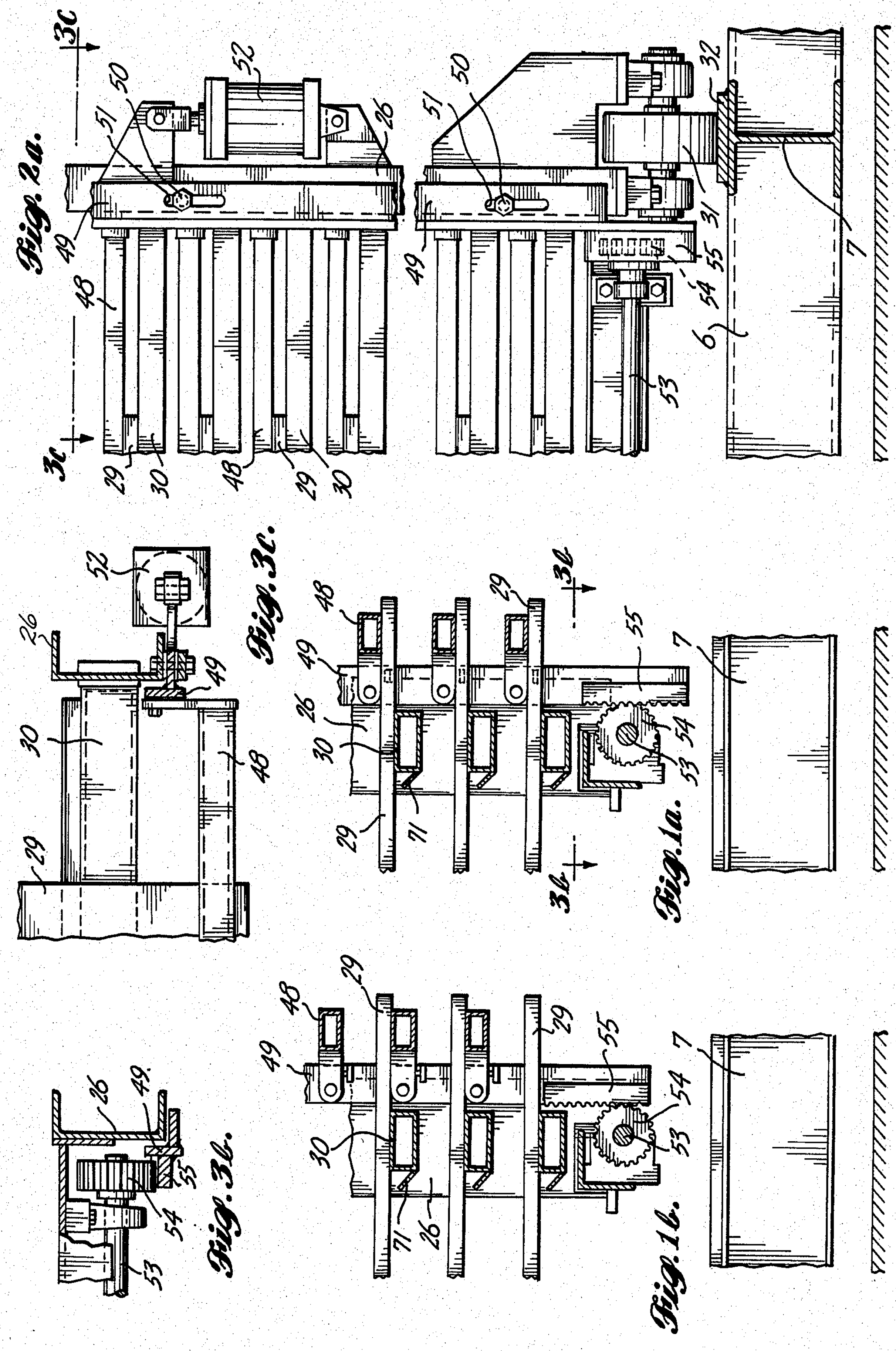
Figure 2:
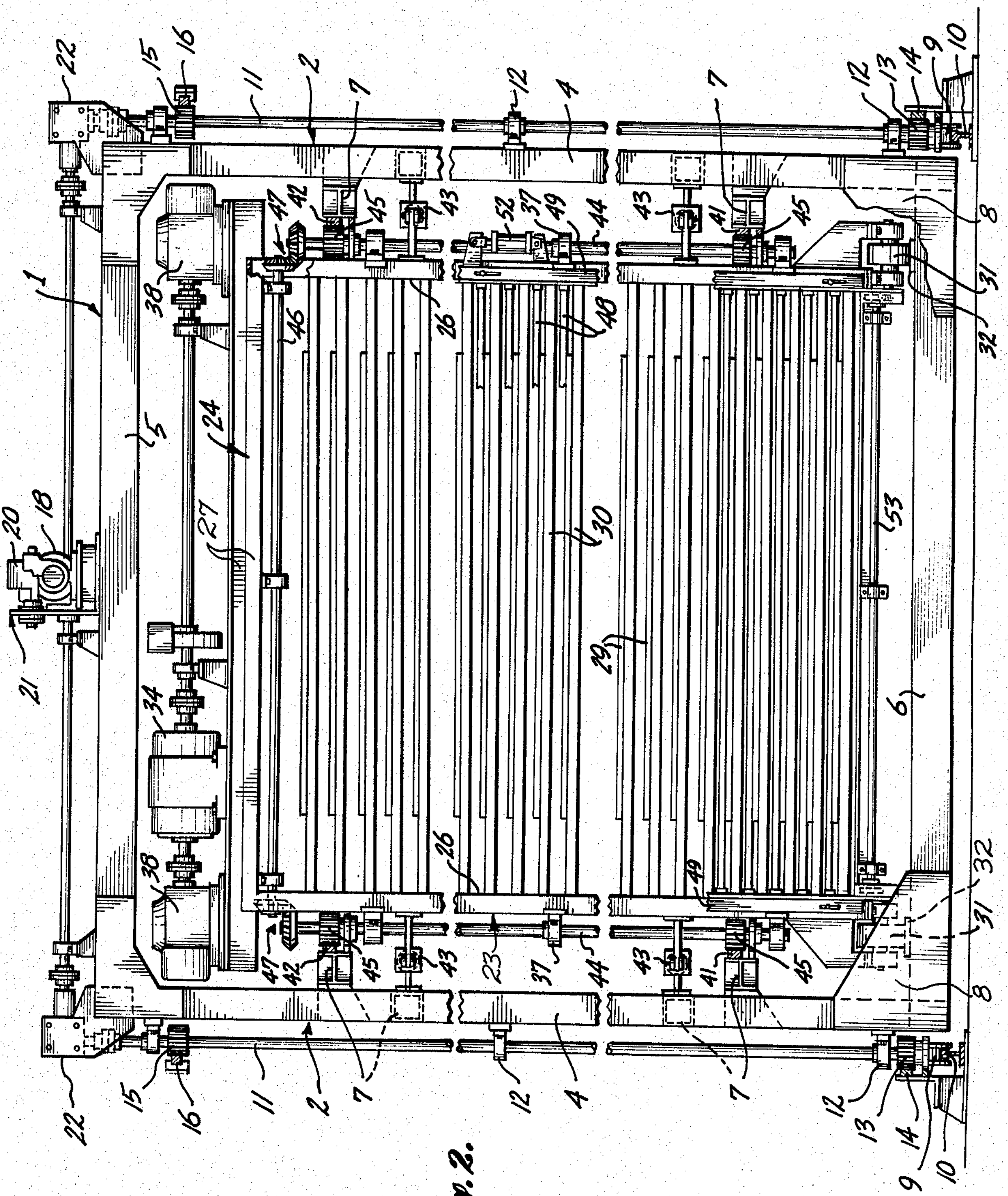
FIG. 2 is a front end elevation of the press-loading mechanism of FIG. 1.
Figure 3A:
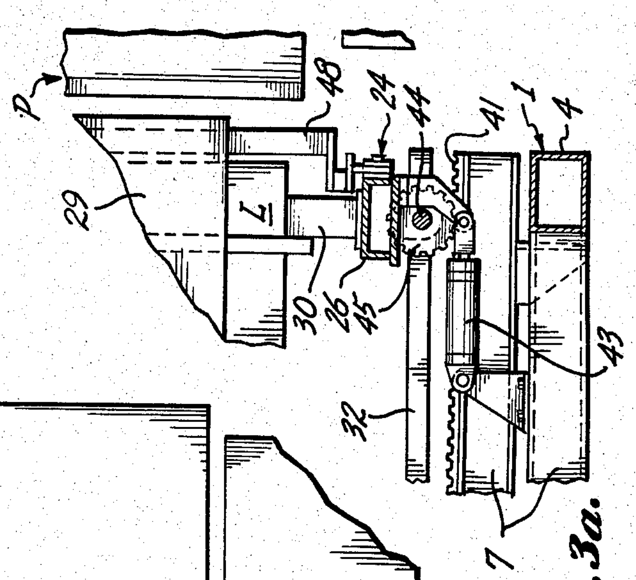
FIG. 3*a* is a fragmentary, enlarged, detail top plan of such press-loading mechanism with parts shown in section.
Figure 3:
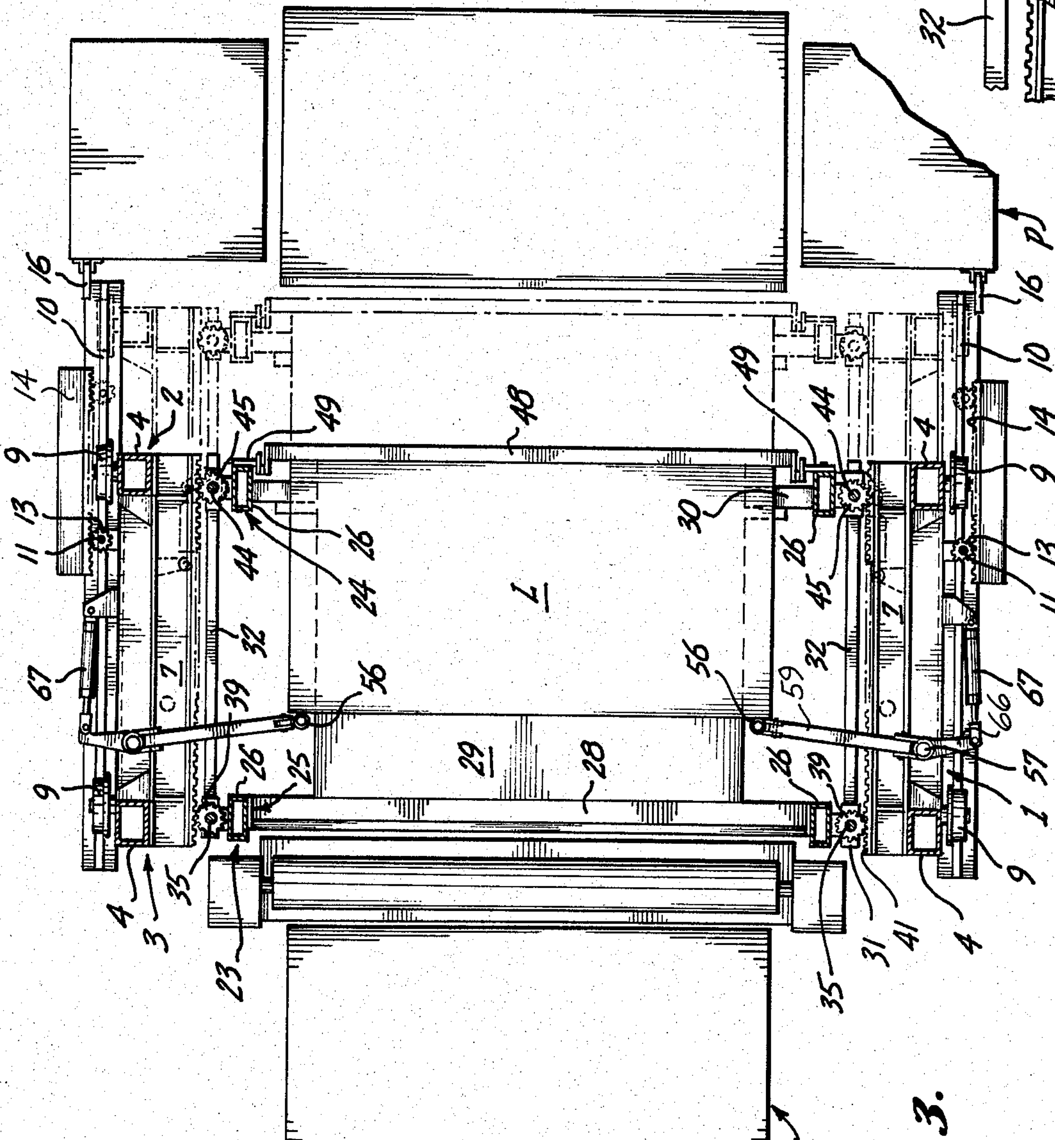
FIG. 3 is a somewhat diagrammatic top plan of the press-loading mechanism of FIG. 1 with parts shown in section.

As illustrated in FIGS. 1, 2 and 3, the preferred embodiment of press-loading mechanism in accordance with the present invention includes an outer main carriage 1 having front and rear upright box frames 2 and 3, respectively. Each upright frame has a pair of upright corner posts or legs 4 connected, as shown in FIG. 2, only at their tops and bottoms by an upper horizontal crossbeam 5 and a lower horizontal crossbeam 6, leaving the ends of the outer main carriage open. Several elevationally spaced, longitudinally extending, horizontal side beams 7 rigidly connect the front and rear upright box frames at each side of the carriage, as shown in FIG. 1. Gussets 8 strengthen the corners of the outer main carriage.

Wheels 9 mounted on the bottom end portions of legs 4 support the outer main carriage for movement along rails 10 between suitable lay-up charging mechanism C and a multiplaten press P as shown in FIG. 1. Drive mechanism for moving the outer main carriage along the rails includes upright drive shafts 11 journaled in bearings 12 mounted on the opposite lateral sides of the carriage toward its forward or press end. Each of the two upright drive shafts carries a bottom pinion 13 meshing with a fore-and-aft extending rack 14 mounted stationarily alongside a rail 10 and an upper pinion 15 meshing with a fore-and-aft extending upper rack 16 that can be supported from the frame of the press by a bracket 17 as shown in FIG. 1. While the bottom racks are stationary, the upper racks are preferably resiliently movable in and out for allowing restrained rocking of the carriage from side to side as it moves along the rails. Rotary power is transferred to the upper ends of the upright drive shafts 11 from a reversible, preferably hydraulic, motor 18, mounted on top of the carriage, through suitable speed-reducing mechanism which can include a gear box 20, a belt or chain and sprocket drive 21 and angle drive mechanism 22.

An inner subcarriage or tray carriage 23 of the press-loading mechanism, best seen in FIGS. 2 and 3, is mounted inside the outer main carriage and includes forward and rear upright frames 24 and 25, respectively, each having a pair of upright corner posts or legs 26 connected by an upper crossbeam 27. The rear frame 25 of the inner subcarriage has several vertically spaced shelf-carrying crossbars 28 extending horizontally between the legs 26 of such rear frame and, as best seen in FIG. 3, a wide, forward projecting shelf or tray 29 is cantilevered from each crossbar 28. The free forward end portion of each shelf rests on a shelf-supporting crossbar 30 extending horizontally between the legs 26 of the forward upright frame 24.

The inner subcarriage is supported on wheels 31 mounted on the bottom portions of legs 26. Such wheels roll along elongated track plates 32 extending longitudinally of the outer main carriage over its lower crossbeams 6. There is no rigid connection between the front and rear frames of the inner subcarriage, so that the inner subcarriage frames are movable independently of each other along the track plates 32 relative to the outer main carriage.

For moving the inner subcarriage rear frame 25, a reversible motor 34, which preferably is a hydraulic motor, is mounted on the upper crossbeam 27 of such frame, as shown in FIGS. 1 and 2. Such motor transfers rotary power to the upper ends of upright drive shafts 35 journaled in bearings 36 mounted on the outer sides of legs 26 through suitable speed-reducing mechanism such as angle drive gearboxes 38. Each upright drive shaft 35 carries lower and upper pinions 39 and 40, respectively, meshing with fore-and-aft extending lower and upper racks 41 and 42, respectively, mounted on the inner upright faces of longitudinal side beams 7 of the outer main carriage.

The inner subcarriage front frame 24 is movable a short distance fore-and-aft relative to the rear frame 25 along the track plates 32 by extension and retraction of the plungers of hydraulic jacks 43, best seen in FIGS. 2 and 3*a*, each connected between a leg 26 of the front frame and a longitudinal side beam 7 of the outer main carriage. To assure simultaneous coordinated fore-and-aft movement of the upper and lower portions of the front frame 24, rotatable upright idler shafts 44 shown in FIGS. 2 and 3*a* carry pinions 45 meshing with the racks 41 and 42 mounted on the outer main carriage beams 7, such idler shafts being journaled in bearings 37 mounted on the outer sides of the front frame legs 26, similar to the mounting of the upright drive shafts 35 on the legs of the rear frame 25. An idler cross shaft 46, mounted below the upper crossbeam 27 of the front frame, coordinates rotation of the two upright idler shafts 44 by meshing sets of bevel gears 47 carried at the upper ends of the upright idler shafts 44 and the outer ends of the idler cross shaft 46.

Another set of movable components of the press-loading mechanism of the present invention is the set of combined stop and pusher bars 48, there being one bar extending horizontally over each shelf 29 generally between the legs 26 of the inner subcarriage front frame 24. Each stop and pusher bar is movable elevationally from a position resting on its shelf to a position raised above the surface of its shelf, as illustrated in FIGS. 1*a* and 1*b*. As best seen in FIG. 2*a*, corresponding ends of the stop and pusher bars are rigidly attached to one flange of an elongated upright angle plate 49 guided for vertical movement by pins 50 projecting forward from a leg 26 and received in vertically elongated slots 51 in the other angle plate flange. Vertical movement of the angle plates, and all of the stop and pusher bars carried by such plates, is effected by actuation of hydraulic jacks 52 connected between the front frame legs 26 and the angle plates. Simultaneous and equal vertical movement of the angle plates is assured by a lower horizontally extending idler shaft 53, rotatably mounted toward the bottom of the inner subcarriage front frame, carrying pinions 54 at its opposite ends. Such pinions mesh with vertical racks 55 carried by the bottom end portions of the angle plates as best seen in FIGS. 1*a* and 1*b*.

Figure 4A:
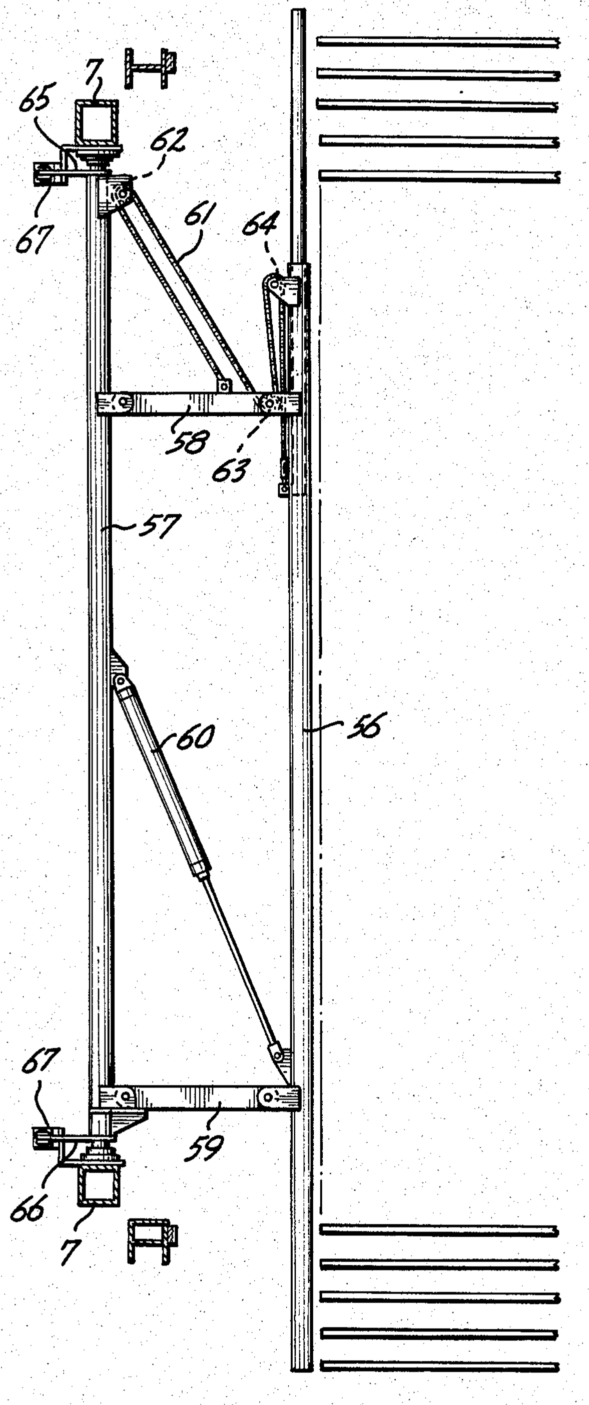
FIG. 4A is a fragmentary rear end elevation of the press loader of FIG. 1 showing the left lay-up-centering rod structure in detail, the remainder of the press-loading mechanism being shown diagrammatically.
Figure 4B:
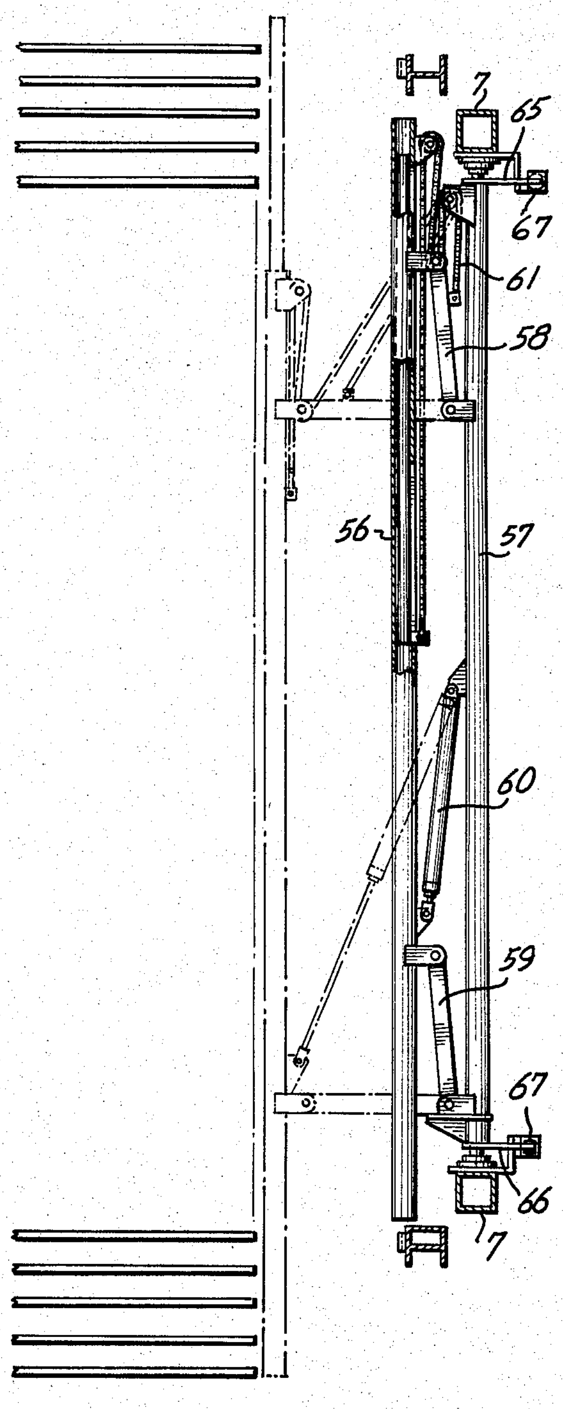
FIG. 4B is a corresponding fragmentary rear end elevation showing the right lay-up-centering rod structure in detail, but with parts in different positions.

The final set of moving components of the press-loading mechanism in accordance with the present invention is alignment mechanism in the form of a set of upright lay-up-centering rods or straight edges 56 shown diagrammatically in FIG. 1 and in greater detail in FIGS. 3, 4A and 4B. So that the other parts of the press-loading mechanism can be seen more clearly, such rods are not shown in FIG. 2.

As shown in FIGS. 4A and 4B, upright pivot shafts 57 are rotatably mounted between longitudinally extending side beams 7 of the outer main carriage 1 at opposite sides of and toward the rear end of such carriage. Upper and lower parallel links or arms 58 and 59, respectively, have their opposite proximate and distal ends pivotally connected respectively, to the pivot shafts and the lay-up-centering rods 56 to guide such rods for swinging toward and away from the pivot shafts while remaining vertical. In-and-out swinging of each rod is effected by a hydraulic jack 60 connected between the central portion of the associated pivot shaft 57 and the bottom end portion of its lay-up-centering rod 56. Such in-and-out swinging is guided by a chain 61 having one end portion connected generally centrally of an upper link 58 from where the chain extends first around a sprocket 62 mounted at the upper end portion of a pivot shaft 57, then around a sprocket 63 carried at the inner end of such upper link, then around a sprocket 64 carried at the upper end portion of a lay-up-centering rod 56 to its other end which is connected to such rod below the sprocket 64.

For effecting generally fore-and-aft swinging of the lay-up-centering rods, lower and upper crank arms 65 and 66, respectively, project generally radially, horizontally outward from the lower and upper end portions of each pivot shaft 57. As seen in FIG. 3, hydraulic jacks 67 connected between a longitudinal side beam 7 of the outer main carriage and such lever arms are operable to swing the outer end portions of such arms fore-and-aft for rotating the pivot shafts, which in turn swing the lay-up-centering rods fore-and-aft.

Summarizing movement of the various movable components of the preferred form of press-loading mechanism in accordance with the present invention: the outer main carriage 1 is movable between the charger C and the press P by actuation of motor 18, for moving the entire press-loading mechanism between the charger and the press; the rear frame 25 of the inner subcarriage 23 is movable fore-and-aft relative to the outer main carriage by actuation of motor 34, for sliding the shelves 29 forward and rearward over the shelf-supporting crossbars 30 of the inner subcarriage front frame 24; the front frame of the inner subcarriage is movable a short distance fore-and-aft relative to the outer main carriage by actuation of jacks 43, with such fore-and-aft movement also moving the combination stop and pusher bars 48 fore-and-aft over the shelves; each combination stop and pusher bar is movable up and down between a position resting on its associated shelf and a position raised above the shelf by actuation of jacks 52; and the upright lay-up-centering rods 56 are swingable between positions adjacent to the inner sides of the outer main carriage and adjacent to the outer sides of the inner subcarriage by actuation of jacks 60, and also are swingable generally fore-and-aft by actuation of jacks 67.

Figure 5A:
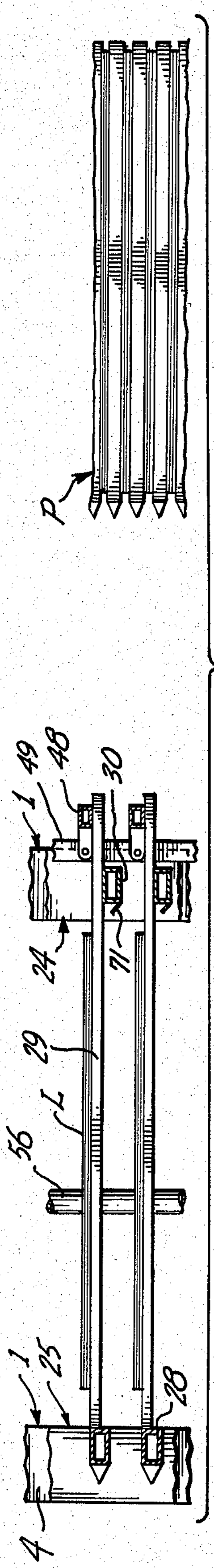
FIGS. 5A through 5H are somewhat diagrammatic, fragmentary, side elevations of the press-loading mechanism of FIG. 1, illustrating progressive stages of operation of such mechanism.

The sequence of operation of the preferred form of press-loading mechanism in accordance with the present invention is shown diagrammatically in FIGS. 5A through 5H. Initially, the outer main carriage 1 is in its rearward shifted position adjacent to the charger C, as is the rear upright frame 25 of the inner subcarriage, as shown in FIG. 5A and in FIGS. 1 and 3; the front upright frame 24 of the inner subcarriage also is in its rearward shifted position, as shown in FIG. 5A and in FIGS. 1 and 3; the combined stop and pusher bars 48 are in their lowered positions, as shown in FIG. 5A and in FIGS. **1*a* and 2*a*; and the upright lay-up-centering rods 56 are in their forward swung positions and are lowered, extending inward from the outer main carriage toward the inner subcarriage, as best seen in FIGS. 4A and 6A**.

To begin the press-loading operation by use of the present invention, an individual panel or lay-up L of veneer is slid onto each of the shelves 29 of the press-loading mechanism. While the lay-ups could be loaded onto the shelves manually, preferably such lay-ups are loaded automatically by a mechanical charger such as the "elevator charger" C shown diagrammatically in FIG. 1. Charger C includes a horizontal lift table 68 supporting a stack of lay-ups. Such lift table is movable elevationally relative to the press-loading mechanism of the present invention along upright side columns 69. As the stack-supporting table 68 is moved elevationally relative to the loading mechanism, feed rolls 70 slide an individual lay-up of sheet material onto each loader shelf 29.

Figure 6A:
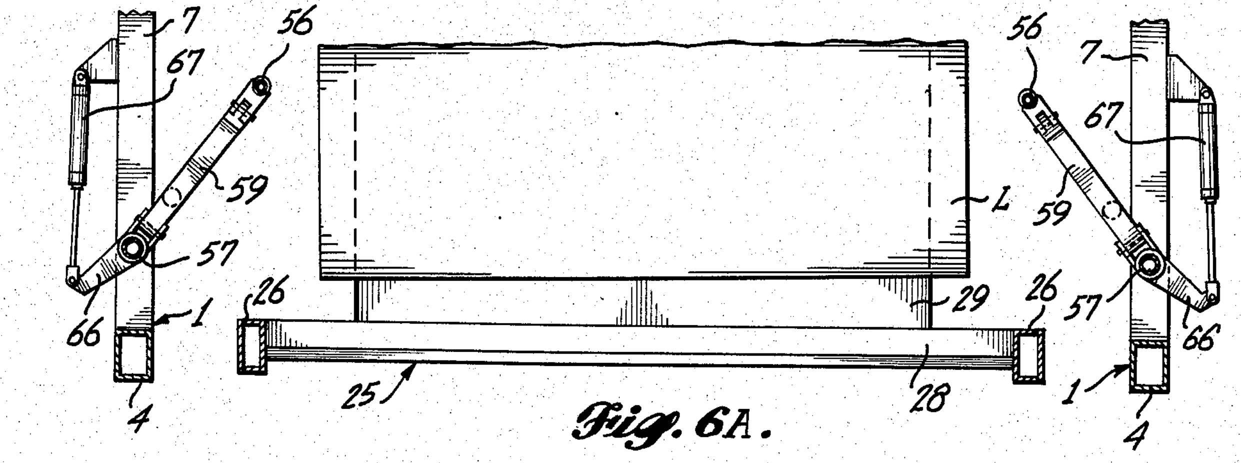
FIGS. 6A through 6C are somewhat diagrammatic top plans of the press-loading mechanism of FIG. 1 with parts shown in section, illustrating progressive stages of operation of the lay-up-centering rods.
Figure 6B:
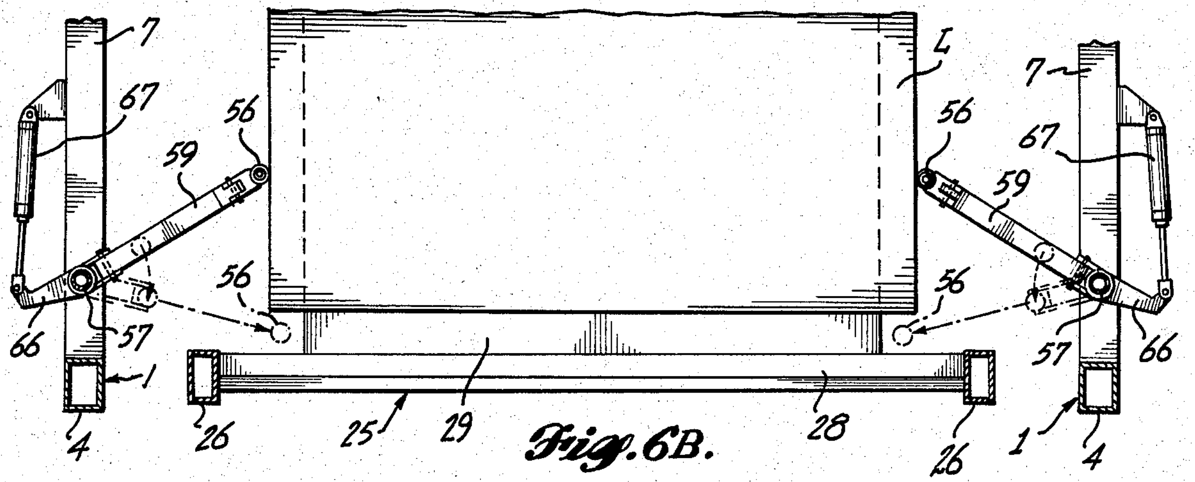

As indicated in FIG. 5A, and as shown in greater detail in FIGS. 6A and 6B, the next step is to center all of the lay-ups on the loader shelves 29 by swinging the lowered upright lay-up-centering rods rearward by retraction of the plungers of jacks 67. The lay-ups are wider than the loader shelves 29 as shown in FIG. 3. For a lay-up that is not centered laterally on its shelf, one or the other of such rods will engage an end of such lay-up and slide it laterally, until all lay-ups are centered between the two lay-up-centering rods with their end portions overhanging equally the opposite lateral edges of their respective supporting shelves 29.

Figure 5B:
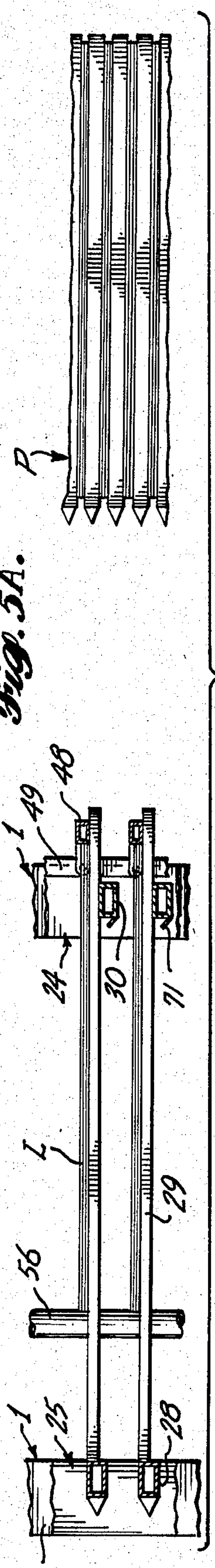
Figure 6C:
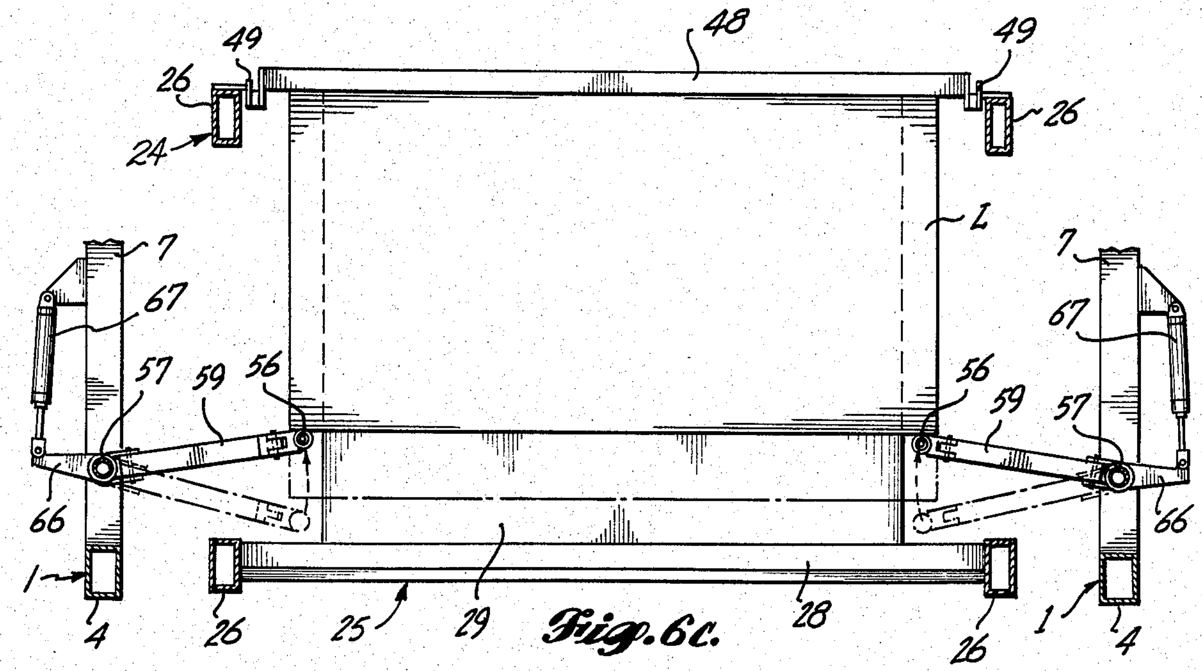

The next step is to swing the lay-up-centering rods upward by retraction of the plungers of jacks 60, as illustrated in FIG. 4B, which retracts the rods from the lay-ups resting on the shelves 29 of the inner sub-carriage, whereupon, as shown in broken lines in FIG. 6B, the retracted rods are swung rearward by retraction of the plungers of jacks 67 and lowered behind the trailing edges of the laterally centered lay-ups. As indicated in FIG. 5B and as shown in FIGS. 3 and 6C, the lay-up-centering rods then are swung forward to engage the trailing edges of the lay-ups near their opposite lateral sides and to slide all of the lay-ups along their shelves until their leading edges engage the lowered stop and pusher bars 48 so that the leading and trailing edges of the lay-ups are vertically aligned. Although the lay-ups are shown as having planar, neatly stacked sheets, often the thin sheets are undulating and present a leading edge angled upward from a shelf. Guide flanges 71 projecting upward and rearward from the shelf-supporting crossbars 30 guide the leading edges of lay-ups below such shelf-supporting crossbars.

The lay-up-centering rods then are raised for retracting them from the inner subcarriage and are swung forward and lowered to the position shown in FIG. 6A ready for the next lay-up-centering operation.

During the loader charging and lay-up-centering operations, the previous batch of lay-ups is being processed in the closed press.

Figure 5C:
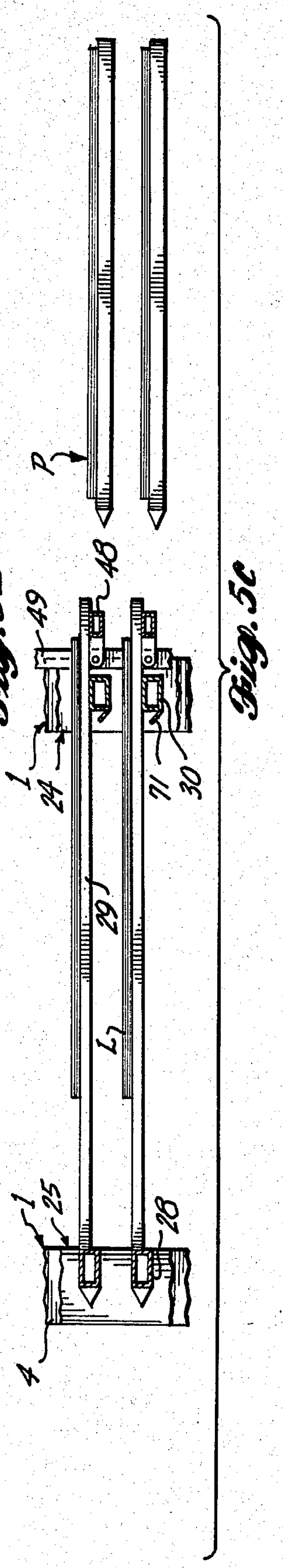
Figure 5D:
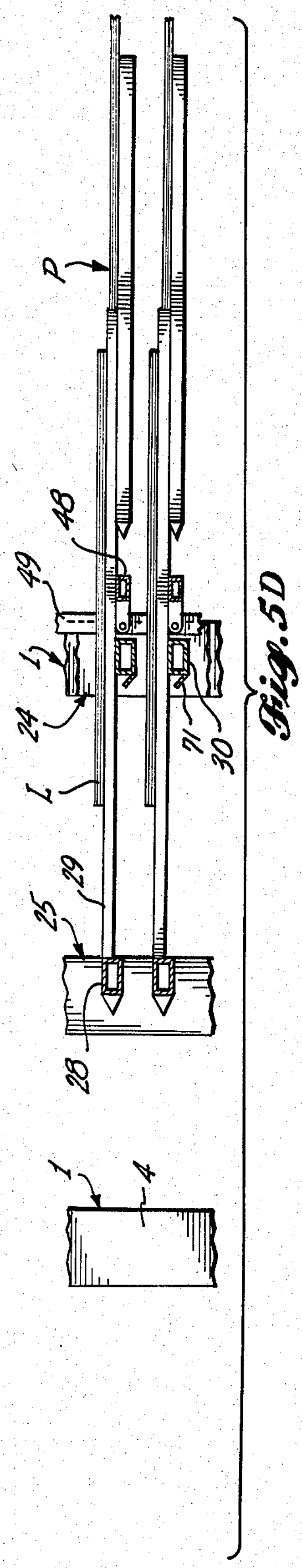
Figure 7C:
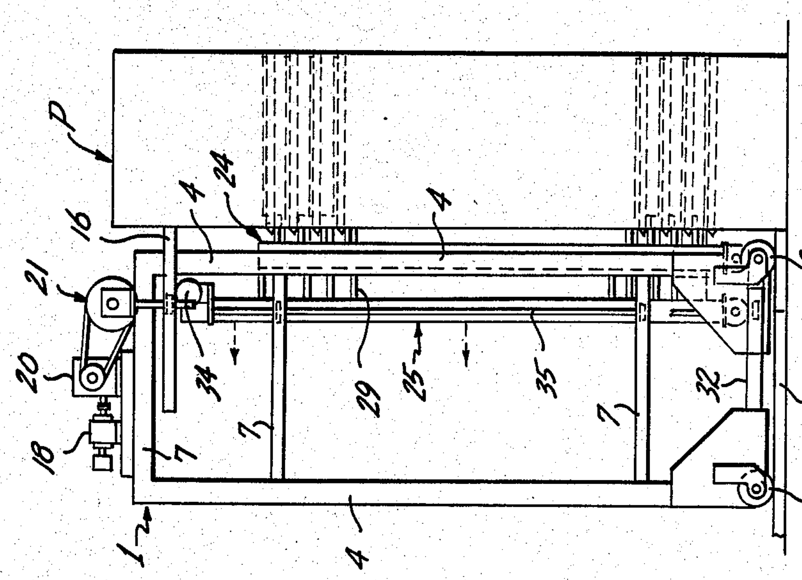
FIGS. 7A through 7C are somewhat diagrammatic side elevations of the press-loading mechanism of FIG. 1 showing, on a reduced scale, the stages of operation illustrated in FIGS. 5D, 5E and 5F, respectively.
Figure 7B:
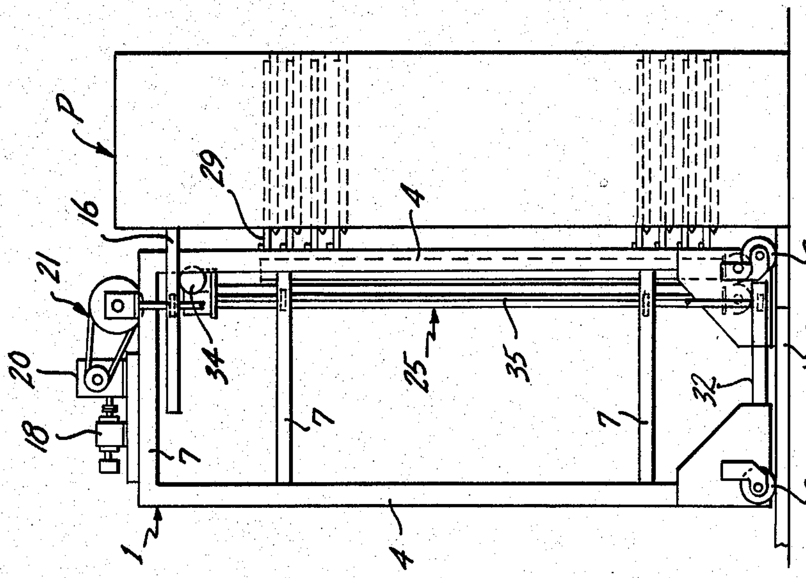
Figure 7A:
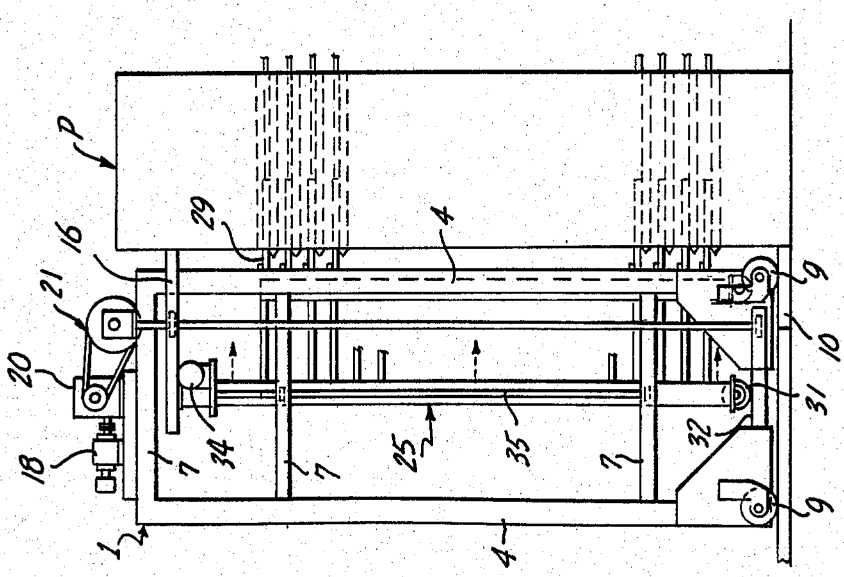

The next step is forward shifting of the outer main carriage 1 through the position of FIG. 5C to the position of FIG. 5D which also is shown in FIG. 7A and in broken lines in FIG. 3. The press is opened during forward shifting of the outer main carriage and the shelves of the loader support the lay-ups in edgewise registration with the spaces or openings between the platens of the open press. The combined stop and pusher bars 48 are raised out of registration with the leading edges of the lay-ups by projection of the plungers of jacks 52 from the position shown in FIG. **1*a* to the position shown in FIG. 1*b***.

Figures 5E, 5F, 5G, 5H:
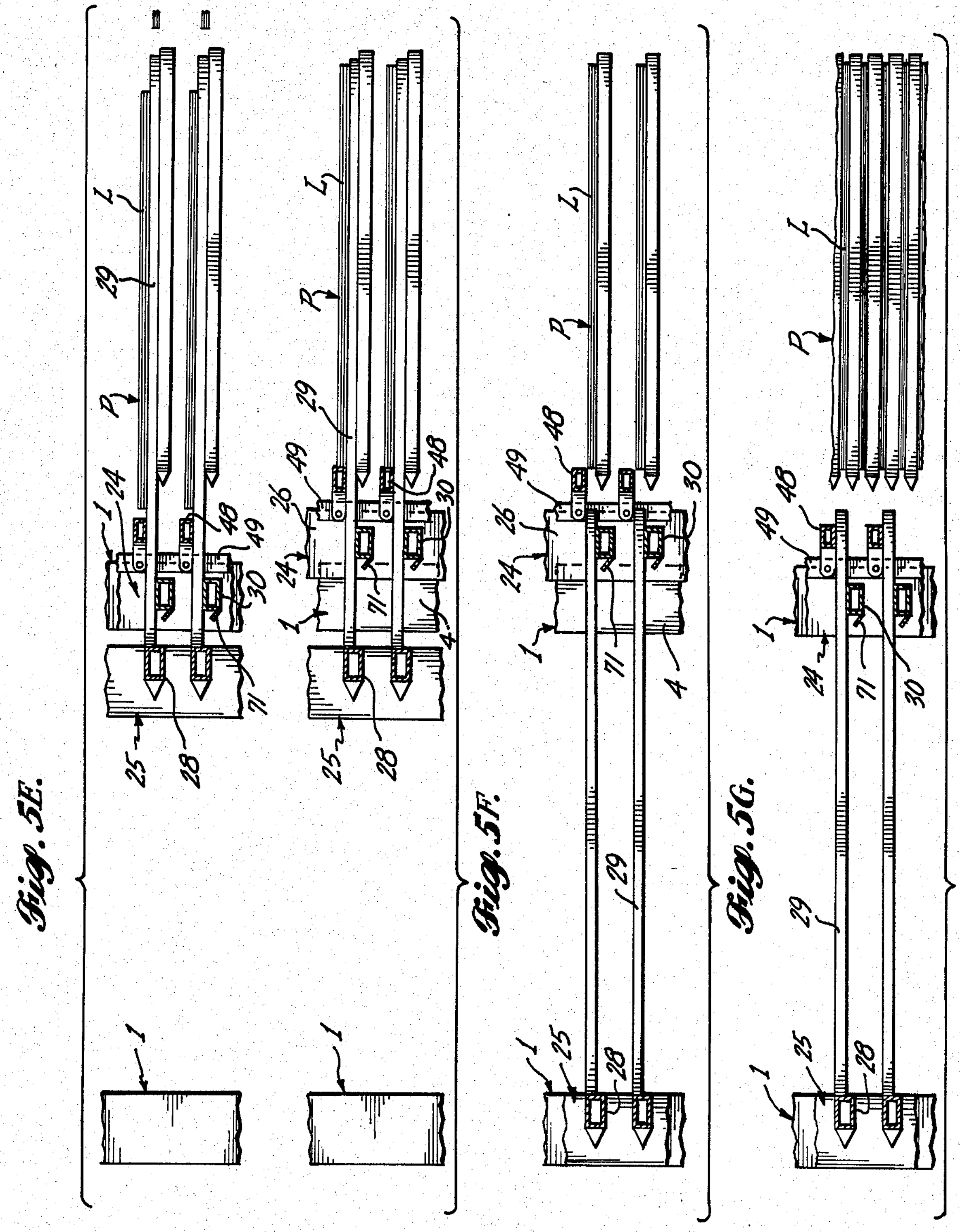

As soon as the outer main carriage reaches its forward shifted position adjacent to the press, the rear upright frame 25 of the inner subcarriage is moved forward by actuation of motor 34, as indicated in FIGS. 5D and 5E and in FIGS. 7A and 7B. Forward movement of the rear frame of the inner subcarriage slides the lay-up-supporting shelves 29 over the shelf-supporting crossbars 30 carried by the inner subcarriage front frame 25. The leading edges of the shelves push the previously processed lay-ups out of the press onto suitable discharge mechanism and move the unprocessed lay-ups resting on the shelves into the press past the raised stop and pusher bars 48.

As indicated in FIG. 5E, the stop and pusher bars 48 then are lowered behind the trailing edges of the unprocessed lay-ups and, with the rear frame 25 of the inner subcarriage held stationary, the front frame 24 is shifted forward by projection of the plungers of jacks 43 shown in FIG. 3*a*, which results in sliding the unprocessed lay-ups forward along their shelves 29 farther into the press. With the stop and pusher bars engaging the trailing edges of the lay-ups to hold the lay-ups from being withdrawn rearwardly, the rear upright frame of the inner subcarriage is moved rearward, as indicated in FIGS. 5G and 7C, so that the shelves are slid out from underneath the lay-ups and the lay-ups fall onto the platens of the press.

Finally, the front upright frame 24 of the inner subcarriage is shifted rearward relative to the rear frame 25, as shown in FIG. 5H, and the press is closed for consolidating the veneers and bonding them to form plywood sheets. The outer main carriage then is moved rearward to the position of FIG. 5A in position for receiving the next batch of lay-ups from the charging mechanism.

A primary advantage of use of the present invention is that lay-ups are inserted simultaneously into a multiplaten press, and, at the same time, previously processed sheets are pushed out of the press. Consequently, the press need only be open intermittently for short periods, and each lay-up remains in the press the same amount of time as all other lay-ups. Since the lay-ups are positively and uniformly centered in the press, the lay-ups are processed uniformly.

Another advantage is that the short straight travel of the press-loading mechanism of the present invention allows a space-saving arrangement of charger, loader and press in a factory or mill. Long shifts in the movable components of the press-loading mechanism are accomplished by rack and pinion drives which are less prone to being jammed by loose pieces of debris, and require less maintenance, than other types of drives such as chain and sprocket drives. Short shifts are accomplished by hydraulic jacks which also are not prone to being jammed by debris and require little maintenance. Since, in the preferred embodiment, only hydraulic actuators are used, known hydraulic control systems can be adapted to operate the press-loading mechanism reliably and automatically in timed sequence with a minimum of supervision and maintenance such as control valve mechanism 72 indicated diagrammatically in FIG. 1 which mechanism can be interposed between a source of hydraulic fluid under pressure and the various hydraulic actuators.

I claim:

1. In mechanism for simultaneously loading a plurality of sheet material lay-ups between generally horizontally extending, vertically spaced platens of a press, such mechanism including:

a plurality of shelf means extending generally horizontally toward and away from the press for supporting the plurality of sheet material lay-ups, respectively, in edgewise registration with spaces between the press platens;

means for supporting the shelf means including a rear shelf support member remote from the press and connected to the shelf means and a front shelf support member adjacent to but separate from the press; and shelf-moving means for moving the rear shelf support member toward and away from the press for moving the shelf means into and out of the press;

the improvement comprising:

a plurality of stop members mounted, respectively, above the shelf means;

first stop-moving means for moving each of said stop members generally vertically relative to the shelf means between a sheet material edge-engageable position adjacent to the upper surface of the respective shelf means and registered with the path of movement of the sheet material lay-up supported thereby into the press and a sheet material edge-disengaged position enabling movement of such shelf means and the sheet material lay-up supported thereby past such stop member into the press; and control means for actuating the shelf-moving means and said first stop-moving means.

2. In the mechanism defined in claim 1, means for maintaining the front shelf support member substantially stationary adjacent to the press during movement of the rear shelf support member by the shelf-moving means such that such movement of the rear shelf support member effects sliding of the shelf means relative to the front shelf support member and the stop members.

3. In the mechanism defined in claim 1, second stop-moving means for moving the stop members generally horizontally toward and away from the press for sliding the stop members along the shelf means independently of movement of the stop members by the first stop moving means.

4. In the mechanism defined in claim 1 or 3, the stop members being mounted on the front shelf support member.

5. In the mechanism defined in claim 4, the first stop-moving means including a fluid operated jack connected between the front shelf support member and the stop members.

6. In the mechanism defined in claim 3, the stop members being mounted on the front shelf support member, and the first and second stop-moving means including separate fluid operated jacks for moving the stop members vertically and horizontally, respectively.

7. In the mechanism defined in claim 3, the second stop-moving means including means for moving the front shelf support member toward and away from the press for moving the stop members carried by the front shelf support member along the shelf means.

8. In the mechanism defined in claim 7, the control means including means for actuating consecutively:

(1) the first stop-moving means to shift the stop members to sheet material edge-disengaged position;

(2) the shelf-moving means to move the rear shelf support member forward such that the shelf means and the sheet material lay-ups supported thereby are moved past the stop members and are inserted into the press;

(3) the first stop-moving means to shift the stop members to sheet material edge-engageable position behind the trailing edges of the sheet material lay-ups; and (4) the second stop-moving means to move the front shelf support member toward the press for shifting the stop members toward the press to engage the trailing edges of the sheet material lay-ups and slide the sheet material lay-ups forward along the shelf means farther into the press.

9. In mechanism for simultaneously loading a plurality of sheet material lay-ups between generally horizontally extending, vertically spaced platens of a press, such mechanism including:

a plurality of shelf means extending generally horizontally toward and away from the press for supporting the plurality of sheet material lay-ups, respectively, in edgewise registration with spaces between the press platens;

means for supporting the shelf means including a rear shelf support member remote from the press and connected to the shelf means and a front shelf support member adjacent to but separate from the press; and shelf-moving means for moving the rear shelf support member toward and away from the press for moving the shelf means into and out of the press;

the improvement comprising:

a plurality of stop members mounted, respectively, above the shelf means;

first stop-moving means for moving each of said stop members relative to the shelf means between a sheet material edge-engageable position adjacent to the upper surface of the respective shelf means and registered with the path of movement of the sheet material lay-up supported thereby into the press and a sheet material edge-disengaged position enabling movement of such shelf means and the sheet material lay-up supported thereby past such stop member into the press; and control means for actuating the shelf-moving means and said first stop-moving means, said control means including means for initially actuating said first stop-moving means to move said stop members to sheet material edge-engageable position enabling loading of the sheet material lay-ups onto the shelf means with their leading edges abutting against said stop members.

10. In the mechanism defined in claim 1 or 9, means for centering the sheet material lay-ups on the shelf means prior to movement of the shelf means into the press, said centering means being mounted adjacent to the rear shelf support member and being movable toward and away from the press for engaging the edges of the sheet material lay-ups remote from the press and for sliding the sheet material lay-ups along the shelf means up against the stop members in their sheet material edge-engageable positions.

11. In the mechanism defined in claim 10, the centering means being movable laterally of the direction of movement of the shelf means into the press for engaging corresponding lateral edges of the sheet material lay-ups and sliding the sheet material lay-ups laterally along the shelf means.

12. In the mechanism defined in claim 9, the stop members being mounted on the front shelf support member.

13. An apparatus for loading panels into a hot press having a plurality of vertically spaced-apart openings for receiving the panels, the apparatus comprising:

a frame for locating near the openings of the press;

a tray carriage mounted on the frame for horizontal reciprocation toward and away from the press, the tray carriage comprising a plurality of vertically spaced-apart horizontal trays for receiving the panels to be loaded into the press, each said tray having two sides, being aligned with one of the openings of the press and being movable into and out of the press with the reciprocation of the tray carriage; and alignment means for vertically aligning front and back edges of the panels, and squaring the panels, before the panels are loaded into the press, the alignment means being mounted on the frame for movement toward and away from the press when the tray carriage is stationary and being engageable with one of said edges of the panels so the alignment means moves the panels along the trays to vertically align the edges thereof.

14. An apparatus as claimed in claim 13, the alignment means comprising vertically aligned engagement means for engaging the one edge of each said panel.

15. An apparatus as claimed in claim 14, the engagement means comprising a pair of vertical straight edges, each said straight edge engaging the panels near one said side of the trays.

16. An apparatus as claimed in claim 15, the straight edges being movable toward the sides of the trays to engage with the panels and being movable away from the sides of the trays to disengage from the panels.

17. An apparatus as claimed in claim 16, comprising first power means for moving the straight edges toward and away from the press.

18. An apparatus as claimed in claim 17, comprising second power means for moving the straight edges toward and away from the sides of the trays.

19. An apparatus as claimed in claim 18, each said straight edge being near a distal end of a pivotable arm, each pivotable arm being pivotally mounted near a proximal end, the proximal end being opposite the distal end.

20. An apparatus as claimed in claim 19, the second power means being connected to the arms for pivoting the arms toward the sides of the trays and away from the sides of the trays.

* * * * *